(12) United States Patent
Criscione, II et al.

(10) Patent No.: US 8,187,062 B2
(45) Date of Patent: *May 29, 2012

(54) SHACKLE WITH PIVOT FEATURE AND LOG CHAIN DRIVE MECHANISM

(75) Inventors: Frank J. Criscione, II, Kansas City, MO (US); William Randall Armstrong, Kansas City, MO (US)

(73) Assignee: Johnson Food Equipment, Inc., Kansas City, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/908,696

(22) Filed: Oct. 20, 2010

(65) Prior Publication Data

US 2011/0263189 A1 Oct. 27, 2011

Related U.S. Application Data

(63) Continuation-in-part of application No. 12/857,390, filed on Aug. 16, 2010, which is a continuation of application No. 12/200,321, filed on Aug. 28, 2008, now Pat. No. 7,789,739, which is a continuation of application No. 11/680,769, filed on Mar. 1, 2007, now Pat. No. 7,422,517.

(60) Provisional application No. 60/781,130, filed on Mar. 10, 2006.

(51) Int. Cl.
A22C 21/00 (2006.01)
(52) U.S. Cl. ...................................................... 452/188
(58) Field of Classification Search .................. 452/179, 452/183, 185, 187–189
See application file for complete search history.

(56) References Cited

U.S. PATENT DOCUMENTS

| 2,818,600 | A | * | 1/1958 | Zebarth | 452/177 |
| 4,187,945 | A | | 2/1980 | Altenpohl | |
| 4,498,578 | A | * | 2/1985 | Altenpohl | 198/680 |
| 5,037,351 | A | * | 8/1991 | Van Den Nieuwelaar et al. | 452/179 |
| 5,092,815 | A | * | 3/1992 | Polkinghorne | 452/179 |
| 5,487,700 | A | * | 1/1996 | Dillard | 452/188 |
| 5,875,738 | A | * | 3/1999 | Hazenbroek et al. | 119/716 |
| 6,017,269 | A | * | 1/2000 | Altenpohl, III | 452/188 |
| 6,179,701 | B1 | * | 1/2001 | Tieleman | 452/179 |
| 6,244,425 | B1 | * | 6/2001 | Volker et al. | 198/686 |
| 6,375,560 | B1 | * | 4/2002 | Verrijp | 452/187 |
| 6,764,393 | B1 | * | 7/2004 | Hazenbroek et al. | 452/188 |
| 6,830,508 | B2 | * | 12/2004 | Hazenbroek et al. | 452/188 |
| 7,789,739 | B2 | * | 9/2010 | Criscione et al. | 452/188 |

* cited by examiner

*Primary Examiner* — Richard Price, Jr.
(74) *Attorney, Agent, or Firm* — Spencer Fane Britt & Browne LLP

(57) ABSTRACT

A device for retaining an animal on a transport system for moving the animal in a forward direction includes a lower portion operable to retain the animal and an upper portion operable for conveyance by the transport system. The upper portion is attachable to the lower portion, and the upper portion includes a connector for connecting the device to a drive mechanism. The connector has a longitudinal axis. The lower portion is operable for movement between a first position in which a longitudinal axis of the lower portion and the longitudinal axis of the connector are in substantially straight orientation relative to each other, and a second position wherein the longitudinal axis of the lower portion and the longitudinal axis of the connector are in substantially angled orientation relative to one another. The lower portion is substantially inhibited from moving in a rearward direction beyond said first position.

25 Claims, 3 Drawing Sheets

SHACKLE WITH PIVOT FEATURE AND LOG CHAIN DRIVE MECHANISM

RELATED APPLICATIONS

The present non-provisional application is a continuation-in-part of application Ser. No. 12/857,390, filed Aug. 16, 2010, entitled SHACKLE WITH PIVOT FEATURE & CONVEYOR THEREFOR, which application is a continuation patent application of application Ser. No. 12/200,321, filed Aug. 28, 2008, entitled SHACKLE WITH PIVOT FEATURE, now U.S. Pat. No. 7,789,739, which application is a continuation application of application Ser. No. 11/680,769, filed Mar. 1, 2007, now U.S. Pat. No. 7,422,517, which claims priority of earlier-filed provisional patent application also having the same title, Ser. No. 60/781,130, filed Mar. 10, 2006. All identified earlier-filed applications are hereby incorporated by reference into the present continuation-in-part application.

FIELD OF THE INVENTION

The present invention relates to devices, such as poultry shackles, for retaining and associating an animal with a transport system, such as a conveyor, during transport to and through one or more processing operations along a processing line. More specifically, the present invention concerns such a device having a log chain drive mechanism and a pivot mechanism for reliably controlling the orientation of the animal during upward and downward travel on the conveyor system so as to both avoid interference with adjacent animals and maximize the efficacy of the processing operations.

BACKGROUND OF THE INVENTION

In the processing of animals, particularly poultry, the animals are typically transported to and through various processing operations along a processing line. At least some of these processing operations are automated. The animals are suspended from shackles which are, in turn, coupled with a conveyor for transporting the animals relatively rapidly along the processing line. The shackles generally depend vertically from the conveyor so as to be substantially parallel with one another.

During processing of animal carcasses, it is sometimes necessary to raise or lower the processing line relative to other portions of the processing line. When it is necessary to raise the processing line, the conveyor slopes upwardly. A convex radius connects the previous lower portion of the conveyor with the upwardly sloping portion. As the shackles travel along this convex radius their relative orientation changes, such that they are no longer parallel to one another. More specifically, they are oriented angularly to one another along radial lines extending outwardly from a center point of the convex radius, such that the lower portions of the shackles, which are opposite the connections with the conveyor, spread apart. Because this change in orientation does not result in physical contact or interference between adjacent animals, it is generally not necessary to prevent it.

When it is necessary to lower the processing line, the conveyor slopes downwardly. A concave radius connects the previous higher portion with the downward sloping portion. As the shackles travel along this concave radius their relative orientation changes, such that they are no longer parallel to one another. More specifically, they are oriented angularly to one another along radial lines extending inwardly toward a center point of the concave radius, such that the lower portions of the shackles, which are opposite the connections with the conveyor, move closer together. This change in orientation can result in physical contact or interference between adjacent animals.

Additionally, even when traveling generally horizontally through the various processing operations, such as scalding and de-feathering operations, some resistance, or rearward force, may result which tends to push the animals backward and changes their orientation. This can cause a number of problems, including that the changed orientation may reduce the efficacy of the processing operations. For example, when moving through a scalder, the animals may, if not held in the correct orientation, float as they move through the scalder, leading to inefficient and incomplete scalding. When moving through a picker, animal carcasses that are allowed to move freely in a rearward direction may ride up over the top of the machine, causing obstructions in the processing line. When moving through a hock cutter, if the animal carcasses are not held in proper orientation, the legs of the animal may be cut unevenly. Further, many plants use rehangers during movement of animal carcasses from a picking line to an eviscerating line. During rehanging, the animals are moved, by automated processes, from a picking shackle to an eviscerating shackle. This transfer requires correct orientation of the animal carcass. Thus, a number of problems may arise from improper orientation of animal carcasses along a processing line.

One solution to the last two problems is to incorporate a pivot mechanism into each shackle and to attach a chain or other linkage extending between a point on the shackle which is below the pivot mechanism and a point on an adjacent shackle which is above its pivot mechanism. In this manner, when the shackle travels along the concave radius, the pivot mechanism allows the shackle to pivot about the pivot mechanism, and thereby allows the change in orientation. When the shackle travels along the convex radius, or when the shackle travels horizontally and the animal experiences resistance, the chain prevents the shackle from pivoting, or from pivoting beyond a particular amount, about the pivot mechanism, and thereby controls the change in orientation.

Unfortunately, the prior art pivot mechanism is prone to failure and disconnection. When this occurs, the shackle remains connected to the conveyor by the chain or other linkage. As a result, the improperly suspended and positioned shackle impedes or otherwise interferes with the processing operations, and can damage the processing apparatuses. Furthermore, removing or repairing the shackle takes time, during which the processing operations must be stopped. In addition, use of a drag-back chain to prevent unwanted backwards movement of an animal carcass results in the coupling of two or more shackles, such that a problem with a single shackle and animal carcass affects multiple shackles.

SUMMARY OF THE INVENTION

The present invention provides a device for retaining an animal on a transport system for moving the animal in a forward direction. The device includes a lower portion operable to retain the animal and an upper portion operable for conveyance by the transport system. The upper portion is attachable to the lower portion, and the upper portion includes a connector for connecting the device to a drive mechanism. The connector has a longitudinal axis.

The lower portion is operable for movement between a first position in which a longitudinal axis of the lower portion and the longitudinal axis of the connector are in substantially straight orientation relative to each other, and a second position wherein the longitudinal axis of the lower portion and the longitudinal axis of the connector are in substantially angled orientation relative to one another. The lower portion is substantially inhibited from moving in a rearward direction beyond said first position.

In one embodiment of the present invention, the lower portion includes first and second stirrups.

In another embodiment of the present invention, the device is a shackle having stirrups, the animal is a poultry animal, and the transport system is a conveyor system.

In still another embodiment of the present invention, the upper and lower portions physically cooperate to define at least one position.

In another embodiment of the present invention, the first position and second position are defined by a channel.

In another embodiment of the present invention, at least one position is defined by a stop.

In another embodiment of the present invention, at least one position is defined by a forward surface of the lower portion contacting a rearward surface of the upper portion.

These and other features of the present invention are discussed in detail below in the section titled DETAILED DESCRIPTION OF THE INVENTION.

BRIEF DESCRIPTION OF THE DRAWING FIGURES

Reference is made herein to the accompanying drawings figures, which are as follows.

DESCRIPTION OF THE INVENTION

Figure 1:
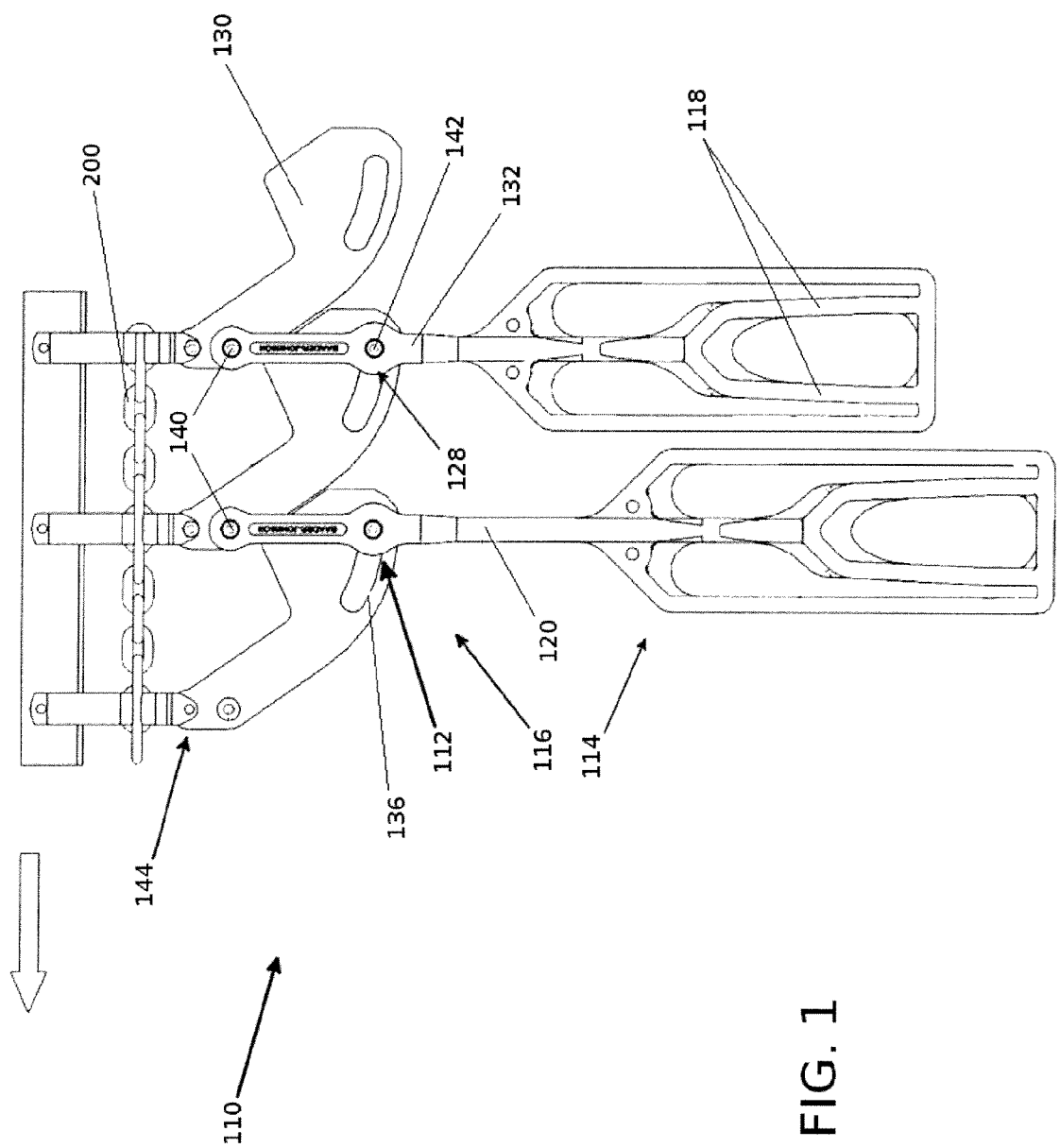
FIG. 1 is an elevation view of a first embodiment of an improved shackle and pivot mechanism, and log chain drive mechanism, of the present invention.

With reference to the figures, an improved shackle 110 is herein described, shown, and otherwise disclosed in accordance with a preferred embodiment of the present invention. Broadly, the shackle 110 incorporates an improved pivot mechanism 112 for more reliably controlling the orientation of the animal during upward and downward travel on the conveyor system so as to both avoid interference with adjacent animals and maximize the efficacy of the processing operations.

Broadly, the shackle 110 retains and associates an animal, such as a poultry animal, e.g., chicken, duck, goose, turkey, with a conveyor or other transport system for transporting the animal along a processing line in which the processing operations occur. In one embodiment, referring to FIG. 1, the shackle 110 broadly comprises a lower portion 114 and an upper portion 116. The lower portion 114 includes first and second spaced-apart stirrups 118 for receiving and retaining the legs of the animal. The upper portion 116 includes a suspension member 120 and the pivot mechanism 112. The suspension member 120 is an elongated rod extending between and connecting the lower portion 114 of the shackle 110 and the pivot mechanism 112.

Figure 3:
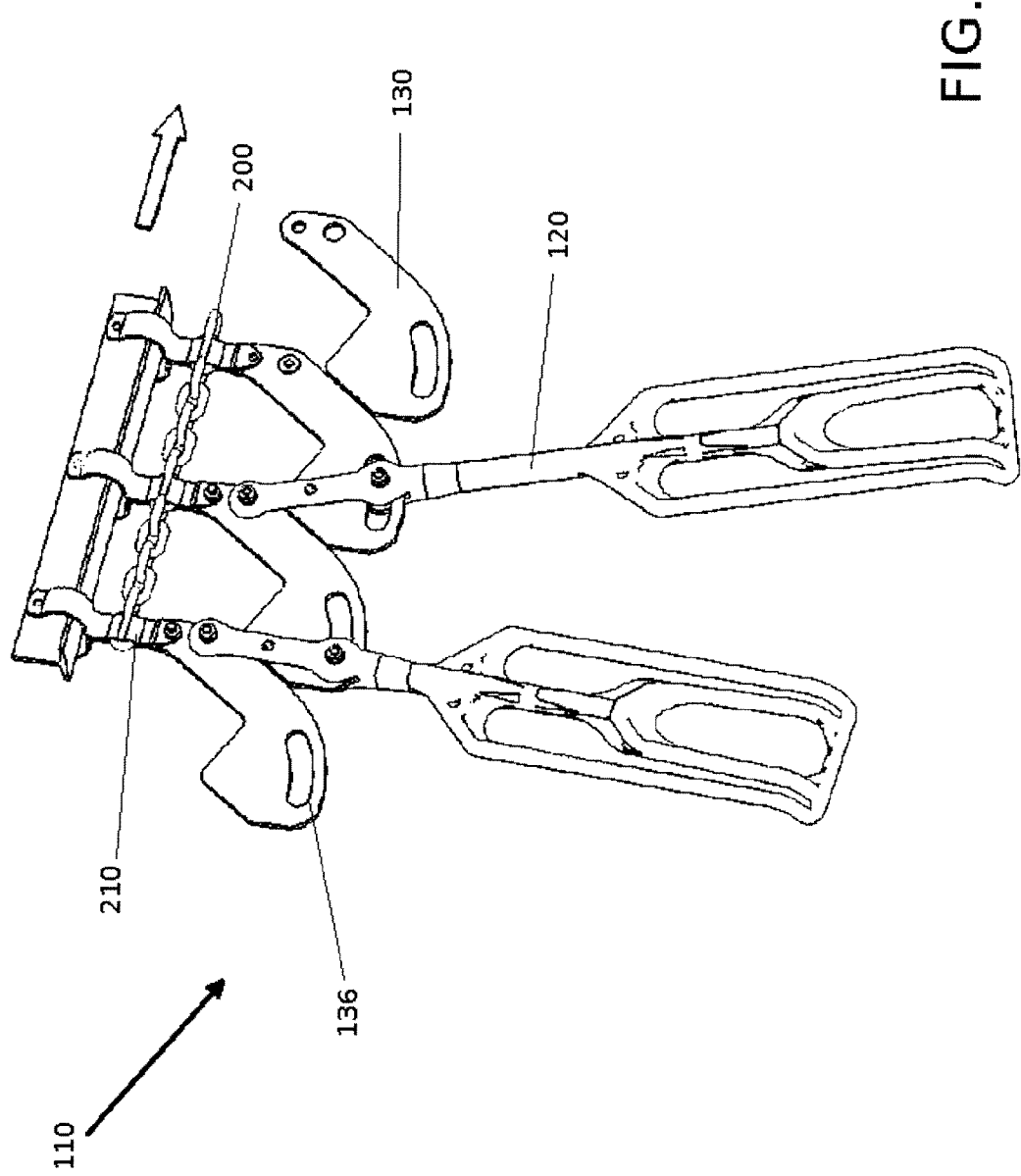
FIG. 3 is an angled elevation view of an embodiment of an improved shackle and pivot mechanism of the present invention, the shackles moving in a downward direction.

The pivot mechanism 112 broadly includes an outer component 128 and an inner component 130. The outer component 128 includes first and second elongated members 132 and 133, which are oriented parallel to and spaced apart from one another, which are fixedly connected, such as, for example, by welding, at a lower end to the suspension member 120, and which present upper and lower aligned holes. The inner component 130 is received between the spaced-apart first and second elongated members 132 and 133 and presents an upper hole and a lower channel 136 which correspond, respectively, to the upper and lower aligned holes of the outer component 128. The lower channel 136 is an elongated arcing channel approximately between fifteen degrees and forty-five degrees or more in one embodiment, and approximately between twenty-five degrees and forty-five degrees or more in another embodiment. An upper bolt 140 extends through the aligned and corresponding upper holes of a first inner component 130, and a lower bolt 142 extends through the aligned lower hole and lower channel 136 of an adjacent inner component 130, to couple the outer and inner components 128 and 130 together in a pivoting relationship. More specifically, the outer components 128 are free to move upon the upper bolt 140; and the lower bolt is free to move within the confines of the lower channel 136 between a first position, as shown in FIG. 1, and a second position. FIG. 3 shows movement of shackles 110 partway along a path between a first position and a second position. An upper portion 144 of the inner component 130 presents one or more spaced-apart holes for coupling the shackle 110 with the conveyor by coupling shackle 110 to inner component 130 and coupling inner component 130 to the conveyor.

Because of the channel and pivot mechanism described above, the shackles 110 are held in a vertical position as they are being transported horizontally. The shackles 110 are preventing from dragging back at an angle without the use of a dragback chain. The shackles 110 pivot, and lower bolt 142 moves along channel 136, when the shackles 110 move in a downward direction. This movement is stopped when lower bolt 142 reaches the other side of channel 136, and shackles 110 are then retained in spaced vertical position relative to one another. When the shackles 110 move upward, they are once again in a first position (as shown, for example, in FIG. 2), and are lifted upward in spaced-apart fashion by action of the pivot mechanism and channel 136. The present invention keeps the shackles 110 from interfering with one another as they move along a processing line. This is accomplished without the use of a dragback chain connecting the shackles 110 to one another. Each shackle 110 functions independently of the others, resulting in less damage to equipment if there is a hang-up or obstruction in the line. It is preferred that the shackles 110 involved in the hang-up or obstruction simply break away from the machine.

In one embodiment, all or portions of the shackle 110 are at least partly constructed from a metal material or combination of such materials, such as carbon or stainless steel. In another embodiment, all or portions of the shackle 110 are at least partly constructed from a natural or synthetic material or combination of such materials, such as rubber, nylon, plastic, fiberglass, and the like.

Figure 2:
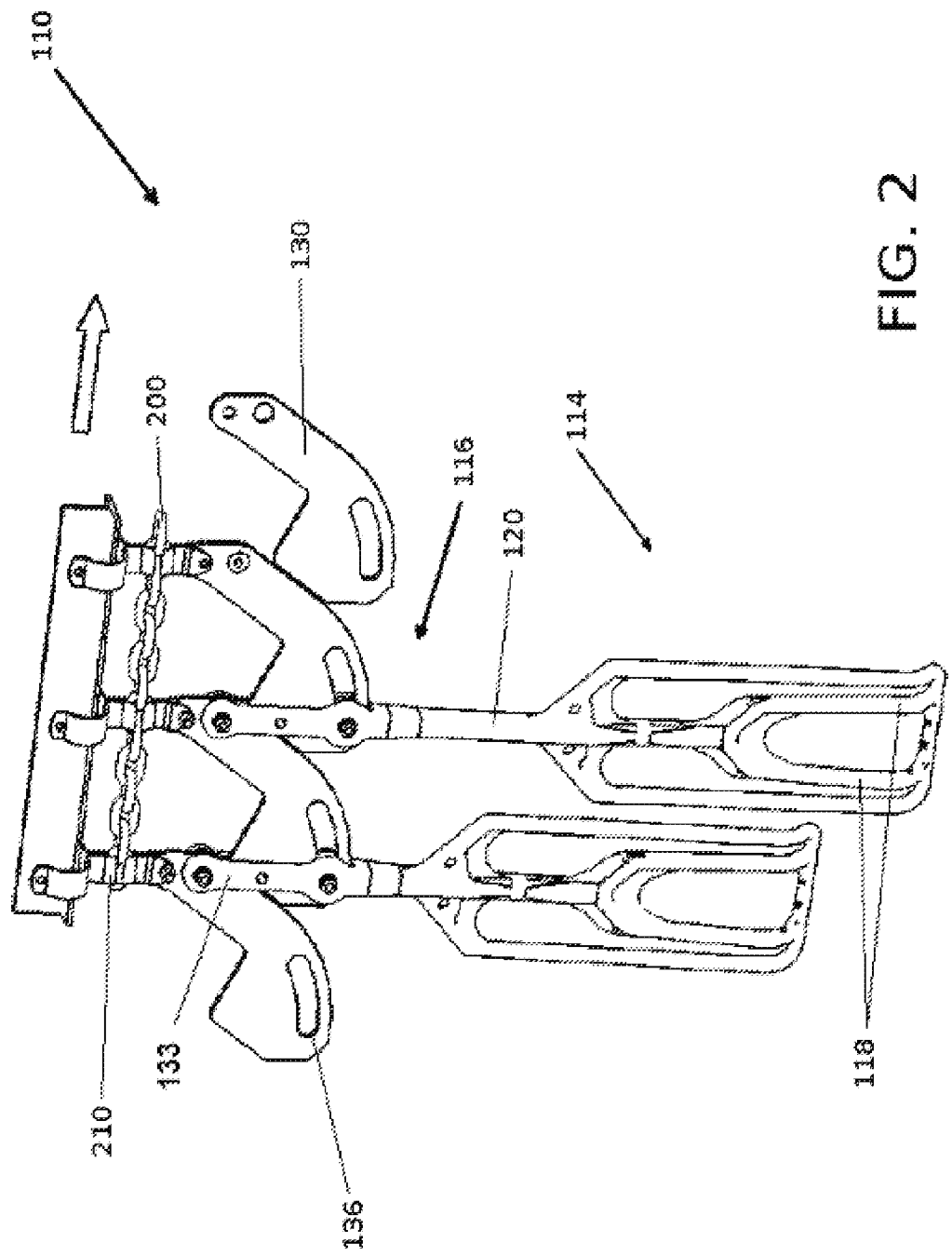
FIG. 2 is an angled elevation view of an embodiment of an improved shackle and pivot mechanism of the present invention, the shackles moving in a horizontal direction.

Illustrative operation of the shackle 110, particularly operation of the pivot mechanism 112, is shown in FIGS. 2 and 3. Referring particularly to FIG. 2, the shackle 110 substantially prevents an undesirable change in orientation rearwardly, i.e., opposite the direction of travel, due to resistance or other rearward force applied to the animals by the processing operations, and thereby maximizes the efficacy of the processing operations. Referring particularly to FIG. 3, the shackle 110 allows for a desirable change in orientation forwardly due to travel in a downward direction, which maintains the animals in a more vertical orientation than they would otherwise be and thereby avoids interference with adjacent animals. In this downward direction, though the animals hang substantially vertically, they may be moved backward by obstructions or other forces up to the range of motion allowed by the present device. Thus, the animals may be moved to a position that is substantially perpendicular to the track, but cannot be moved backwards beyond that point.

As shown in FIG. 1, the present invention further includes a log chain drive mechanism 200 by which the various shackles 110 are moved along a conveyor system associated with the present invention. Log chain 200 is preferably attached to a connecting component 210 affixing inner component 130 to a conveyor. The present invention is adapted such that the forward motion of the log chain 200 does not produce a rearward motion of shackles 110 beyond that allowed by channel 136.

Although the invention has been disclosed with reference to various particular embodiments, it is understood that equivalents may be employed and substitutions made herein without departing from the scope of the invention as recited in the claims.

Having thus described the preferred embodiment of the invention, what is claimed as new and desired to be protected by Letters Patent includes the following:

1. A device for retaining an animal on a transport system for moving the animal in a forward direction, the device comprising:
   a lower portion operable to retain the animal; and
   an upper portion operable for conveyance by the transport system, the upper portion attachable to the lower portion, and the upper portion comprising a connector for connecting said device to a drive mechanism, the connector having a longitudinal axis,
   wherein the lower portion is operable for movement between a first position in which a longitudinal axis of the lower portion and the longitudinal axis of the connector are in substantially straight orientation relative to each other and a second position wherein the longitudinal axis of the lower portion and the longitudinal axis of the connector are in substantially angled orientation relative to one another,
   and further wherein the lower portion is substantially inhibited from moving in a rearward direction beyond said first position.

2. The device according to claim 1 wherein the lower portion comprises first and second stirrups.

3. The device according to claim 1 wherein the device is a shackle having stirrups, the animal is a poultry animal, and the transport system is a conveyor system.

4. The device according to claim 1 wherein the upper and lower portions physically cooperate to define at least one position.

5. The device according to claim 4 wherein the first position and second position are defined by a channel.

6. The device according to claim 4 wherein at least one position is defined by a stop.

7. The device according to claim 4 wherein at least one position is defined by a forward surface of the lower portion contacting a rearward surface of the upper portion.

8. The device according to claim 1 wherein the connector is attached to a drive mechanism.

9. The device according to claim 8 wherein the drive mechanism comprises a chain.

10. The device according to claim 1 wherein the upper portion comprises an outer portion having a first end and a second end, and further wherein a first end of said upper portion is attached to a first inner portion, and a second end of said upper portion is attached to a second, adjacent inner portion.

11. A device for retaining an animal on a transport system for moving the animal in a forward direction, the device comprising:
    a lower portion operable to retain the animal;
    an upper portion operable for conveyance by the transport system, the upper portion comprising an inner component and an outer component;
    a connector for connecting the inner component to a drive mechanism, the connector having a longitudinal axis;
    wherein the outer component having a first end and a second end, wherein the first end of the outer component is attached to a first inner component, and the second end of the outer component is attached to a second adjacent inner component and to the lower portion;
    wherein the lower portion is operable for movement between a first position in which a longitudinal axis of the lower portion and the longitudinal axis of the connector are in substantially straight orientation relative to each other and a second position wherein the longitudinal axis of the lower portion and the longitudinal axis of the connector are in substantially angled orientation relative to one another; and
    wherein the lower portion is substantially inhibited from moving in a rearward direction beyond said first position.

12. The device according to claim 11 wherein the lower portion comprises first and second stirrups.

13. The device according to claim 11 wherein the device is a shackle having stirrups, the animal is a poultry animal, and the transport system is a conveyor system.

14. The device according to claim 11 wherein the upper and lower portions physically cooperate to define at least one position.

15. The device according to claim 14 wherein the first position and second position are defined by a channel.

16. The device according to claim 14 wherein at least one position is defined by a stop.

17. The device according to claim 14 wherein at least one position is defined by a forward surface of the lower portion contacting a rearward surface of the upper portion.

18. The device according to claim 11 wherein the connector is attached to a drive mechanism.

19. The device according to claim 18 wherein the drive mechanism comprises a chain.

20. A device for retaining an animal on a transport system for moving the animal in a forward direction, the device comprising:
    a lower portion operable to retain the animal;
    an upper portion operable for conveyance by the transport system, the upper portion comprising an inner component and an outer component;
    wherein the outer component having a first end and a second end, the first end of the outer component is attached to a first inner component, and the second end of the outer component is attached to a second adjacent inner component and to the lower portion;
    a connector for connecting the inner component to a drive mechanism, the connector having a longitudinal axis;
    a channel defining:
      a rearward position in which a longitudinal axis of the lower portion and the longitudinal axis of the connector are in substantially straight orientation relative to each other;

a forward position in which the longitudinal axis of the lower portion and the longitudinal axis of the connector are in substantially angled orientation relative to each other; and wherein, in moving between the rearward and forward positions, the lower portion pivots about a pivot axis which is substantially perpendicular to the longitudinal axis of the connector.

21. The device as set forth in claim 20, wherein the difference between the straight orientation and the angled orientation is approximately between 15 degrees and 45 degrees.

22. A shackle for retaining an animal on a conveyor system operable to move the animal in a forward direction through process, the conveyor system including at least one inclined or declined portion, the shackle comprising:

an upper portion operable for conveyance by the transport system, the upper portion comprising an inner component and an outer component;

wherein the outer component having a first end and a second end, the first end of the outer component is attached to a first inner component, and the second end of the outer component is attached to a second adjacent inner component;

a lower portion attached to the second end of the outer component and operable to retain the animal;

a connector for connecting the inner component to a drive mechanism, the connector having a longitudinal axis;

the lower portion substantially inhibited from moving in a rearward direction beyond an orientation in which the lower portion is substantially straight relative to the connector; and wherein the inner component and the outer component move relative to each other to maintain the lower portion in a substantially vertical orientation as the shackle moves through the at least one inclined or declined portion.

23. The shackle according to claim 22, wherein the connector is substantially perpendicular to the conveyor system, and the outer component moves relative to the inner component between a substantially perpendicular orientation to the conveyor system and a non-perpendicular orientation to the conveyor system when the shackle moves through the at least one inclined or declined portion.

24. The shackle according to claim 22, further comprising a pivot connection between the inner component and outer component.

25. The shackle according to claim 24, further comprising a guide channel defined in the inner component, the guide channel operable to limit relative movement between the inner component and the outer component.

* * * * *